United States Patent [19]

Simon, Jr. et al.

[11] Patent Number: 5,023,778

[45] Date of Patent: Jun. 11, 1991

[54] INTERPROCESSOR COMMUNICATION METHOD

[75] Inventors: Robert C. Simon, Jr., Novi, Mich.; Dale W. Deutscher, Phoenix, Ariz.; Charles M. Grimm, Luxembourg, Luxembourg; Dennis D. Thompson, Atlanta; Kirk A. Bailey, Carmel, both of Ind.

[73] Assignees: General Motors Corporation, Detroit, Mich.; Delco Electronics Corp., Kokomo, Ind.

[21] Appl. No.: 498,080

[22] Filed: Mar. 23, 1990

[51] Int. Cl.⁵ .................. G06F 15/16; G06F 13/00
[52] U.S. Cl. .................. 364/200; 364/222.2; 364/260; 364/238.7; 364/247.4; 364/228
[58] Field of Search ... 364/200 MS File, 900 MS File, 364/514; 370/61, 83

[56] References Cited

U.S. PATENT DOCUMENTS

| | | | |
|---|---|---|---|
| 4,047,159 | 9/1977 | Boudry | 364/200 |
| 4,418,382 | 11/1983 | Larson et al. | 364/200 |
| 4,473,879 | 9/1984 | Tachinchi et al. | 364/200 |
| 4,511,968 | 4/1985 | Fencsik et al. | 364/200 |
| 4,577,273 | 3/1986 | Hopper et al. | 364/200 |
| 4,590,554 | 5/1986 | Glazer et al. | 364/200 |
| 4,654,784 | 3/1987 | Campanini | 364/200 |
| 4,669,044 | 5/1987 | Houser et al. | 364/200 |
| 4,866,597 | 9/1989 | Kinshita | 364/200 |
| 4,870,571 | 9/1989 | Frink | 364/200 |
| 4,882,727 | 11/1989 | Williams et al. | 370/79 |

OTHER PUBLICATIONS

Motorola Semiconductor Technical Data, MC68HC11A8 HCMOS Single-Chip Microcomputer Advance Information, pp. 1∝6 through 6-6, 1985.

*Primary Examiner*—Michael R. Fleming
*Assistant Examiner*—Gopal C. Ray
*Attorney, Agent, or Firm*—Howard N. Conkey

[57] ABSTRACT

A communication method provides for an exchange of a multiple byte message between two processors. Interrupt suppression associated with the message transfer is minimized by alternating the processors between master and slave operating modes with each byte exchanged.

3 Claims, 3 Drawing Sheets

INTERPROCESSOR COMMUNICATION METHOD

BACKGROUND OF THE INVENTION

This invention relates to a method of communication between processors.

Numerous techniques have been developed for processor-to-processor communications using multiple byte messages. Usually, a master/slave relationship is established for the two processors to avoid bus contention problems and multiple byte messages are either exchanged in their entirety with processor interrupts disabled or on a byte-by-byte basis using some type of hardware feedback mechanism which allows the slave to notify the master when it is ready for another byte.

These communication techniques work well, but do have their drawbacks. The first technique requires interrupt suppression for the duration of the message exchange. This may not be a problem in some systems, but as message lengths increase and interrupt timing becomes critical, prolonged interrupt suppression may not be acceptable since processor throughput is limited by the interrupt suppression time. The second technique can be interrupt driven. This eliminates prolonged interrupt suppression as message lengths increase, but requires the use of additional processor I/O lines which are often needed for other purposes.

SUMMARY OF THE INVENTION

This invention provides for a method of exchanging multiple byte messages between two processors that minimizes interrupt suppression to maximize the processor throughput and which does not require any hardware feedback mechanism.

In general, the communication method of this invention takes the form of an alternating master communication method wherein a multiple byte message is exchanged between two processors which alternate as the master device on the system bus.

In the alternating master communication method of this invention, the first one of the processors initiates a message exchange by enabling its serial peripheral interface (SPI) system in a master mode, lowering the slave select line of the second-processor, and placing the first byte of its output data into the SPI data register. After exchange of the first byte of data, the first processor raises the slave select line of the second processor, reads the data received from the second processor, re-enables its SPI system in the slave mode, and stores its second byte of output data into the SPI data register in preparation for exchange. Prior to this message initiation, the second processor has its SPI system enabled in the slave mode and has the first byte of its output data waiting in the SPI data register.

When the first data byte exchange is complete, an interrupt is generated in the second processor. The interrupt routine of the second processor reads the first data byte received from the first processor, re-enables its SPI system in the master mode, lowers the slave select line of the first processor, stores its second byte of output data into the SPI data register, waits for the data exchange to complete, raises the slave select line of the first processor, reads the second data byte received from the first processor, re-enables its SPI system in the slave mode, and stores its third byte of output data into the SPI data register in preparation for exchange.

When the second data byte exchange is complete, an interrupt is generated in the first processor. The interrupt routine of the first processor reads the second data byte received from the second processor, re-enables its SPI system in the master mode, lowers the slave select line of the second processor, stores its third byte of output data into the SPI data register, waits for the data exchange to complete, raises the slave select line of the second processor, reads the third data byte received from the second processor, re-enables its SPI system in the slave mode, and stores its fourth byte of output data into the SPI data register in preparation for exchange. The two processors alternately configure themselves as SPI masters and interrupt one another with a byte of data in this manner until the entire message has been exchanged.

By use of the foregoing alternating master communication method, the time dedicated to the transmission of a multiple byte message is minimized to maximize the efficiency of the processor operation. Interrupt suppression occurs only while the processor is configured in a master mode for the time to transfer one data byte. After providing for an exchange of a data byte while configured in a master mode, a processor re-configures itself into a slave mode, enables its interrupts and then proceeds to execute other tasks while waiting for the exchange of a data byte from the second processor acting as the master processor. Accordingly, it can be seen that interrupts are suppressed in the processor while configured as the master only during the period of the transmission of one byte of data. At all other times, the processor is free to perform other tasks until such time that an interrupt request is generated upon the receipt of another data byte in the message exchange. By so minimizing the interrupt suppression, the efficiency of the processors are maximized by maximizing the processor throughput.

DESCRIPTION OF THE DRAWINGS

The foregoing and other objects of this invention may be best understood by reference to the following description of a preferred embodiment and the drawings in which.

DESCRIPTION OF THE PREFERRED EMBODIMENT

Figure 1:
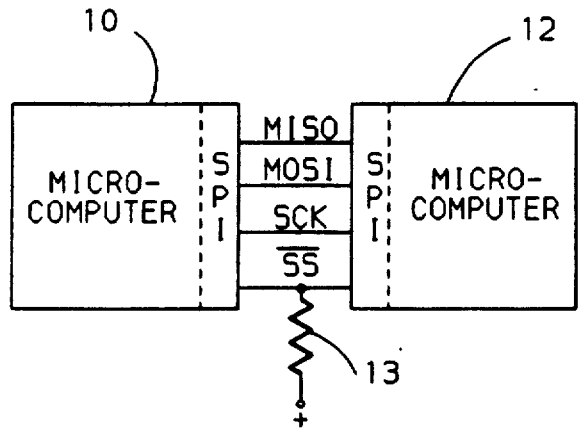
FIG. 1 is a general diagram of a dual processor system incorporating the alternating master communication method of this invention.

Referring to FIG. 1, there is generally illustrated a dual processor system including a microcomputer 10 and a microcomputer 12. Each of the microcomputers 10 and 12 perform assigned tasks in a system in accord with programs stored in respective read only memories. For example, the microcomputers 10 and 12 may be employed in an automotive vehicle wherein one microcomputer functions to control the vehicle engine while the other microcomputer may function to control the vehicle transmission. In their respective controls, each one of the microcomputers 10 and 12 require information to be provided by the other one in the execution of the respective tasks. Typically, the information transmitted between the microcomputers is comprised of multi-byte messages.

In a prior art typical method of transmitting these multiple byte messages, one of the microcomputers is configured as a master and the other one is configured as a slave. In order to exchange information, the master microcomputer suppresses its interrupts, selects the slave microprocessor and transmits the first byte of information. The master microcomputer then waits until the slave microcomputer responds to the interrupt request generated upon receipt of the data byte to distribute the message received and to prepare another byte for exchange. The master microcomputer then initiates the exchange of the second byte of information. The procedure is repeated until the message is exchanged. During the complete period of the exchange during which its interrupts are suppressed, the master microcomputer is not able to perform any of its other functions even though a substantial amount of time may be expended simply waiting for the slave microcomputer to respond to the interrupt request generated upon receipt of the data byte. This interrupt suppression in the master processor severely restricts its throughput capability resulting in an inefficient utilization of its capability.

In accordance with this invention, a method of exchanging multi-byte messages between the microcomputers 10 and 12 is provided which minimizes the interrupt suppression time thereby maximizing the throughput capability of the microcomputers.

In the preferred form, each of the microcomputers 10 and 12 includes a serial peripheral interface subsystem (SPI) which is utilized in the transmission or exchange of data. Each of the SPI's of the microcomputers 10 and 12 is selectively configurable in either a master operating mode or a slave operating mode. An example of such a microcomputer that is configurable in either a slave or master operating mode is the Motorola MC68HC11 single chip microcomputer that includes, in addition to the SPI, on-chip memory including a read only memory and a random access memory, an analog to digital converter, a timer system and a central processing unit.

Each microprocessor SPI includes (A) a master-in slave-out (MISO) pin configured as a data input in a master device and a data output in a slave device, (B) a master-out slave-in (MOSI) pin configured as a data output in a master device and as a data input in a slave device, (C) a serial clock output pin SCK functioning as a clock output in a master device and a clock input in a slave device and (D) a slave select SS pin which is used to chip select a slave when it goes low. Each of the SPI pins MISO, MOSI, SCK and SS of the microcomputer 10 are coupled to the corresponding pins in the microcomputer 12 as shown in FIG. 1 where the connecting lines are correspondingly labeled. In operation, data is exchanged between the microcomputers 10 and 12 on the MISO and MOSI lines in response to clock signals provided by the master device on the SCK line. The use of the common clock signals provided by the master device synchronizes data movement both in and out of the SPI's on the MOSI and MISO lines. A pull-up resistor 13 is coupled between the slave select line SS and a voltage source to prevent both processors from being left in a slave operating mode at the end of a message transmission.

Figure 2A:
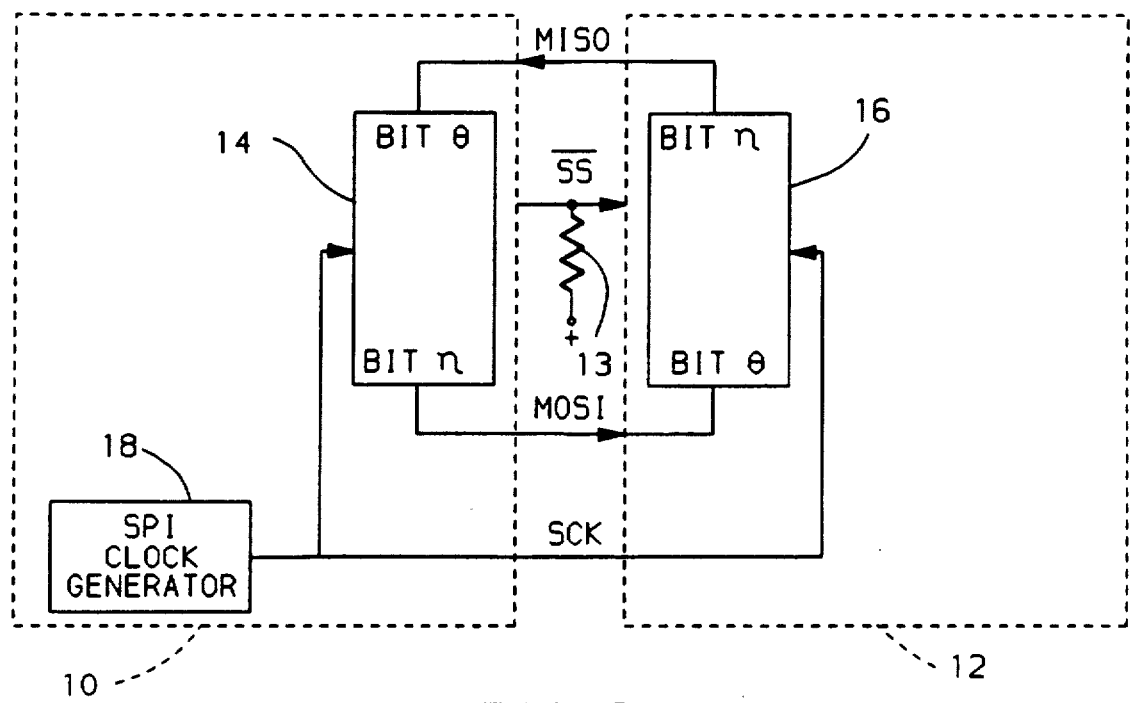
FIGS. 2A and 2B are schematic diagrams of the SPI of each of the processors of FIG. 1 illustrating the alternating master communication method.
Figure 2B:
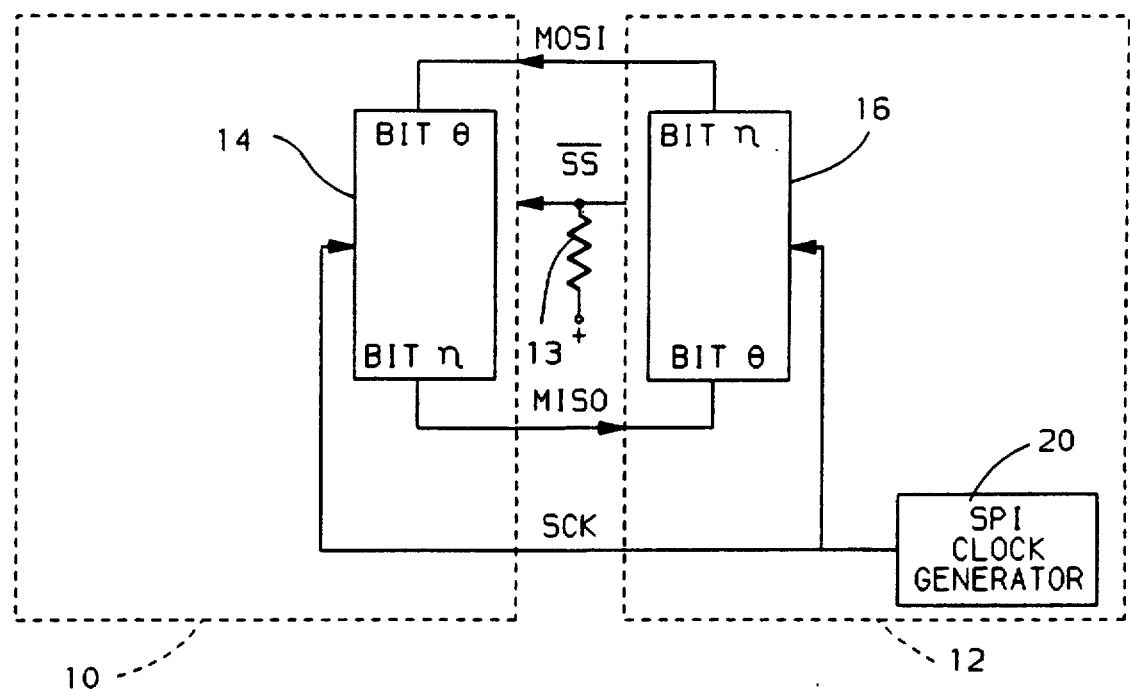

Referring to FIGS. 2A and 2B, each of the SPI's of the microcomputers 10 and 12 include a respective n bit shift register 14 and 16. For purposes of illustration, it will be assumed that each byte of information to be exchanged contains eight bits such that each of the shift registers 14 and 16 are eight bit shift registers (n=7).

FIG. 2A illustrates the microcomputer 10 and 12 in the condition wherein the microcomputer 10 is configured as a master and the microcomputer 12 is configured as a slave. When so configured, the SCK line is an output of the microcomputer 10 and an input to the microcomputer 12 such that the output of an SPI clock generator 18 of the microcomputer 10 is coupled to the clock input of both to its own shift register 14 and the clock input of the shift register 16 of the slave microcomputer 12. The clock output of the clock generator 18 idles high or low until a data byte is written into the master shift register 14 at which point eight clock signals are generated to shift the eight bits of data out of the shift register 14 into the shift register 16 via the MOSI line. Simultaneously, the clock signals shift the eight bits of the data byte in the shift register 16 into the shift register 14 via the MISO line. At the end of the eight clock signals, the data byte has been exchanged. A logic low from the master microcomputer 10 on the SS line selects the slave microcomputer 12.

FIG. 2B illustrates the condition wherein the microcomputer 12 is configured as the master and the microcomputer 10 is configured as the slave. In this condition, the clock line SCK is an output of the microcomputer 12 which provides clock pulses from the SPI clock generator 20 to the clock inputs of both the shift registers 14 and 16 so that the slave microcomputer 10 is synchronized with the master microcomputer 12. When data is written into the shift register 16, eight clock signals are generated by the SPI clock generator 20 to shift the data byte from the shift register 16 to the shift register 14 via the MOSI line and a data byte in the shift register 14 to the shift register 16 via the MISO line.

By alternating the roles of the microcomputers 10 and 12 between master and slave in accord with the configurations illustrated in 2A and 2B during the exchange of a multi-byte message, optimum operating efficiency of the microcomputers 10 and 12 are provided by the minimization of the interrupt suppression of the master computer.

In the preferred mode of the invention, one of the microprocessors 10 and 12 initiates all message exchanges. Arbitrarily, it will be assumed that all message exchanges are initiated by the microcomputer 10. Accordingly, the microcomputer 10 is initially configured as a master at the beginning of each message exchange and the microcomputer 12 is initially configured as a slave.

Figure 3:
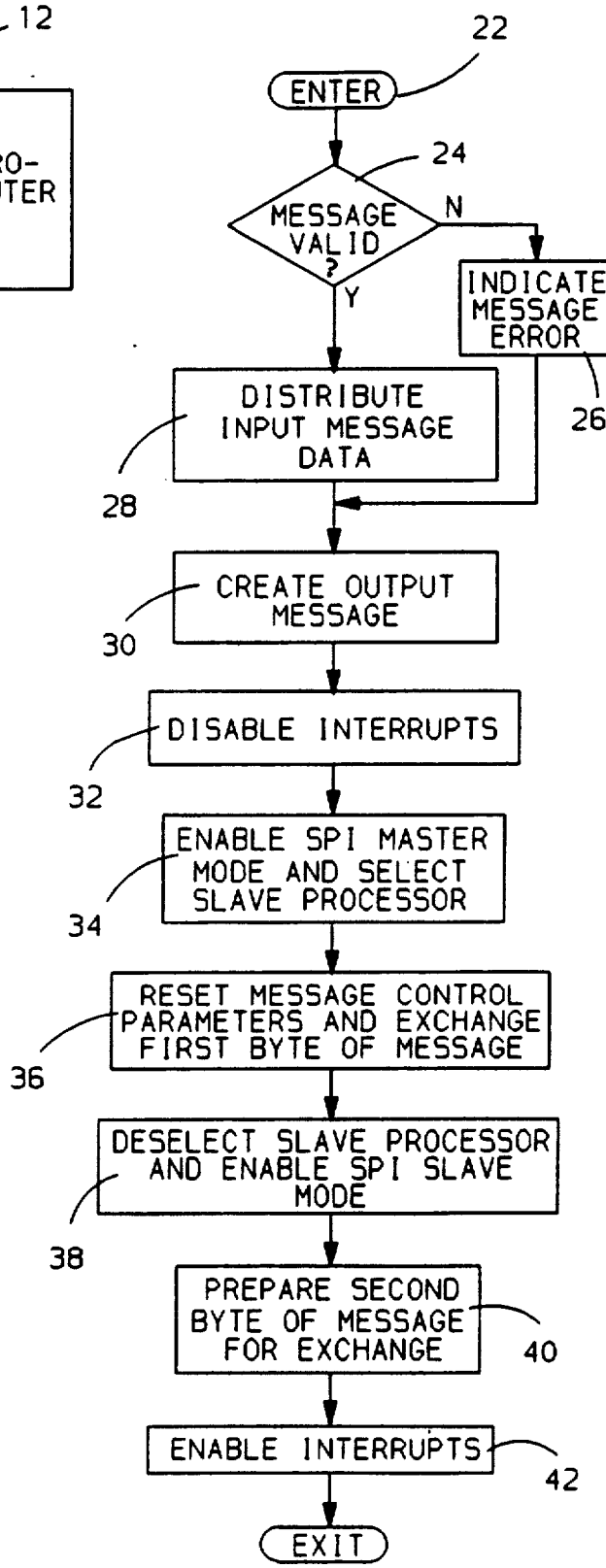
FIGS. 3-5 are flow diagrams illustrating the operation of the processors of FIG. 1 in exchanging multiple byte messages in accord with the principles of this invention.

A routine executed in accord with a program stored in ROM by the microcomputer 10 that initiates the exchange of messages between the computers is illustrated in FIG. 3. This routine is a time interrupt routine that is executed at repeated constant time intervals such as 10 milliseconds. This interval is greater than the time required to exchange a message between the microcomputers 10 and 12. While in other embodiments the messages may comprise a variable number of bytes, it will be assumed in this embodiment that each message exchanged between the microcomputers 10 and 12 is comprised of a constant predetermined number of bytes.

Upon generation of the time interrupt, the routine for initiating a message exchange by the originating microcomputer 10 is entered at point 22 and then proceeds to a step 24 which determines whether or not the previous message received from the microcomputer 12 is a valid message. The criteria used may include (A) whether or not it had received the predetermined number of bytes representing a complete message, (B) whether or not the processors are in or out of sync and (C) whether or not an input message checksum is correct. If any of the conditions indicate a message is not valid, a message error is indicated at step 26. Assuming, however, that the message is determined valid, the program distributes the message received at a step 28 to an appropriate memory location.

The microcomputer 10 then creates the output message to be transmitted to the microcomputer 12 at step 30. Thereafter at step 32, the master disables its interrupts and then at step 34 configures its SPI in the master mode and selects the slave microcomputer 12 by providing a logic low on the slave select line SS.

At step 36, the master microcomputer 10 resets its message control parameters and exchanges the first byte of message by placing the first byte into the shift register 14 and then generating eight clock signals via the SPI clock generator 18 which clocks the eight bits of the first byte out of the shift register 14 into the shift register 16 via the MOSI line and clocks the eight bits of the first byte of information in the shift register 16 (provided therein via the routine of FIG. 4 to be described) into the shift register 14 via the MISO line. At this step, the microcomputer 10 also reads the first byte of information received from the shift register 16 in the microcomputer 12.

Following the exchange of the first byte, the slave microcomputer 12 is deselected at step 38 and the microcomputer 10 reconfigures its SPI in a slave mode. As previously indicated, when so configured, the clock line SCK is configured as an input to the shift register 14. At the next step 40, the microcomputer 10 prepares the second byte of the message to be exchanged and loads the byte into the shift register 14. Interrupts are then again enabled at step 42 after which the program exits the routine of FIG. 3. At this point in time, the microcomputer 10 is configured as a slave. Following the enabling of the interrupts at step 42, the microcomputer 10 is free to perform other tasks and until such time that an interrupt request is generated upon the receipt of a data byte on the MOSI line.

Figure 4:
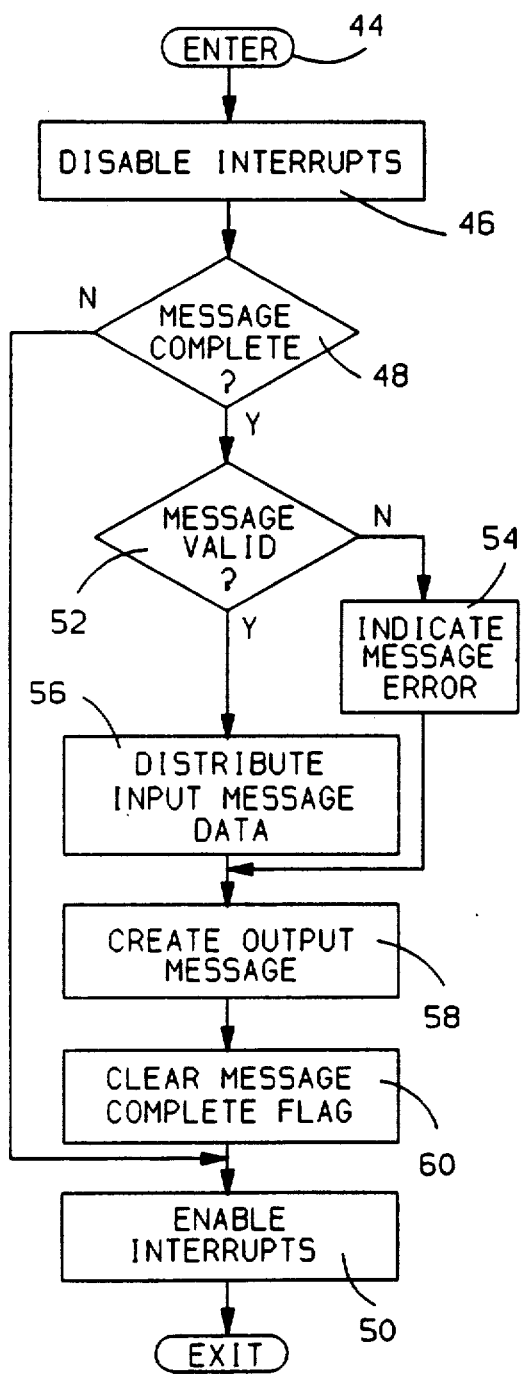

Referring to FIG. 4, the routine executed by the microcomputer 12 which does not initiate the message exchange is set forth. This routine is executed on a time interrupt basis at the same rate as the routine of FIG. 3 executed by the microcomputer 10. Upon generation of the time interrupt, the routine is entered at step 44 and proceeds to step 46 where interrupts are disabled. The program then determines at step 48 whether a complete message has been exchanged between the microcomputers 10 and 12. This is done by sampling the state of a message complete flag that is set by the interrupt routine of FIG. 5 when a complete message has been received. If the message transfer is not complete (message complete flag cleared), the program then again enables interrupts at step 50 and exits the routine.

Returning to step 48, if a complete message has been exchanged between the microcomputers 10 and 12 (message complete flag set), the program determines at step 52 whether or not the message is valid based on similar parameters as described in regard to step 24 of FIG. 3. If the message is not valid, a message error is indicated at step 54. However, if the message is valid, the message is distributed at step 56 such as by transferring the message to an appropriate random access memory location. At step 58, the next output message to be transmitted to the microcomputer 10 is created and the first byte is placed in the shift register 16 after which the message complete flag is cleared at step 60. The interrupts are then enabled at step 50 after which the program exits the routine of FIG. 4. At the end of the routine of FIG. 4, the microcomputer remains configured in a slave mode.

In general, the routines of FIG. 3 and 4 are executed by the respective microcomputers 10 and 12 to prepare the messages to be exchanged and to initiate the exchange of the first byte of the message. In this exchange, the microcomputer 10 is initially configured as a master and the microcomputer 12 is initially configured as a slave. Following the transmission of the first byte, the microcomputer 10 is then reconfigured as a slave.

Figure 5:
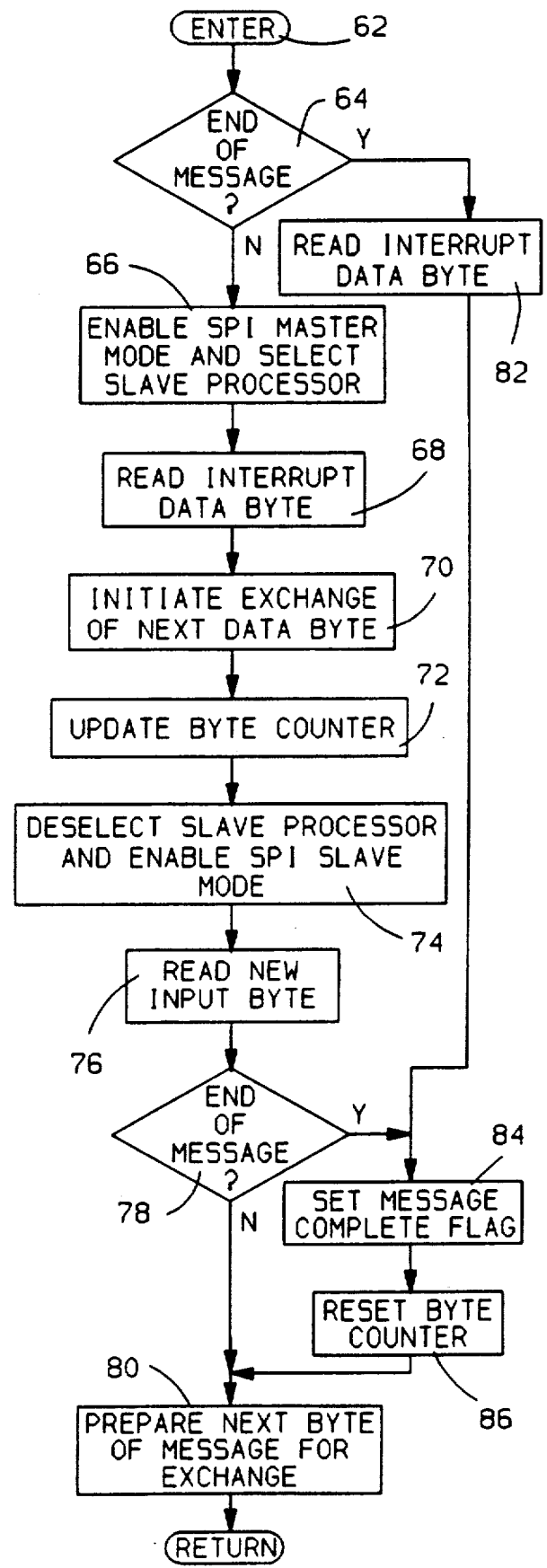

Each of the microcomputers 10 and 12 when configured as a slave generates an interrupt request upon the completion of the transfer of a data byte. The routine executed by each of the microcomputers 10 and 12 for servicing this interrupt is illustrated in FIG. 5. For illustration purposes, it will be first assumed that the microcomputer 12 while configured as a slave has just received a data byte from the microcomputer 10 such as via the message initiating routing of FIG. 3. In response to the resulting interrupt request, the interrupt routine is entered at point 62 after which the routine determines at step 64 whether or not the last byte exchanged is the last byte of the message to be exchanged. This determination is based on the count in a byte counter. If not, indicating at least one more data byte is to be exchanged, the program proceeds to a step 66 wherein the SPI is configured in the master mode and the slave select output is set low to select the microcomputer 10 which is configured as a slave.

At step 68, the data byte just received is read and buffered after which the next data byte to be transmitted to the microcomputer 10 is loaded into the shift register 16 at step 70. Also at step 70 and after the data byte is loaded, the SPI clock generator 20 generates eight clock signals for shifting the data byte out of the shift register 16 into the shift register 14 of the microcomputer 10 via the MOSI line and for shifting the data byte out of the shift register 14 of the microcomputer 10 into the shift register 16 via the MISO data line. Following this exchange of data bytes, step 72 updates the byte counter by incrementing the counter by two representing the number of bytes read during the present interrupt. Thereafter, the slave microcomputer 10 is deselected at step 74 and the SPI is again reconfigured to a slave mode. The new byte received during the exchange at step 70 is then read and buffered at step 76. It can be seen from the foregoing that during the interrupt routine of FIG. 5, two bytes of the message from the microcomputer 10 are read. Step 78 then determines whether or not all of the bytes of the message have now been exchanged. If not, the program proceeds to step 80 where the next byte of the message to be transmitted is prepared and loaded into the shift register 16. Thereafter, the program exits the interrupt routine.

The microcomputer 10 having just received a data byte from the microcomputer 12 while configured as a slave generates an interrupt request and proceeds to execute the routine of FIG. 5 in the same manner as previously described in relation to the microcomputer 12. In general, the microcomputer 10 then functions via the routine of FIG. 5 as a master in the exchange of the next data byte with the microcomputer 12 configured as a slave.

The microcomputers 10 and 12 alternately execute the routine of FIG. 5 as previously described during which the microcomputer executing the routine functions as the master for exchanging data bytes (steps 66-72) while the other functions as the slave until such time that it detects at step 64 or step 78 that the last byte exchanged was the last byte of the message. Assuming first that step 64 determines that the byte received (resulting in the interrupt request) is the last one of the message, the program proceeds directly to a step 82 where the byte received is read and buffered. Thereafter, the message complete flag is set at step 84 and the byte counter is reset at step 86. From step 86, the step 80 is executed where the first byte of the next message is placed in the shift register in preparation of the next message exchange initiated by the microcomputer 10.

The condition wherein the last byte of the message is exchanged via step 70 is sensed at step 78. When sensed, the program proceeds from step 78 to the steps 84 and 86 previously described and then to step 80 to prepare the first byte of the next message for exchange.

As can be seen from the foregoing, the alternating master communication method does not require prolonged interrupt suppression normally associated with a master waiting for the slave to respond to its interrupt to process transmitted data. Accordingly, the method provides for increasing the efficiency of the microcomputers by increasing the time available to execute other tasks.

The foregoing description of a preferred embodiment of the invention for purposes of illustrating the invention is not to be considered as limiting or restricting the invention since many modifications may be made by the exercise of skill in the art without departing from the scope of the invention.

What is claimed is:

1. A method of exchanging multiple bye messages between first and second processors each being selectively configurable in a master operating mode for controlling data bye exchanges or in a slave operating mode in which an interrupt is generated upon the exchange of a data byte with a processor configured in a master operating mode, the method comprising the steps of:

initating a message exchange by the first processor that is initially configured in a master operating mode by (A) selecting the second processor that is initially configured in a slave operating mode, (B) commanding the exchange of a first data byte of a first multiple byte message of the first processor and a first data byte of a second multiple byte message of the second processor, (C) preparing a second data byte of the first multiple byte message for exchange and (D) reconfiguring itself in a slave operating mode and initiating exchanges of subsequent data bytes of the first and second multiple byte messages by each of the first and second processors responding to an interrupt generated upon the exchange of a data byte while being configured in a slave operating mode by (A) reconfiguring itself in a master operating mode, (B) selecting the other one of the first and second processors, (C) commanding the exchange of the next data byte of the first and second multiple byte messages, (D) preparing the next data byte of its multiple byte message for exchange and (E) reconfiguring itself in a slave operating mode, whereby the first and second processors are alternately configured in a master operating mode to command exchanges of the data bytes of the multiple byte messages.

2. A method of transferring messages comprises of multiple data bytes between first and second processors each having a respective data register and each being selectively configurable as a master for controlling data byte exchanges or as a slave selectable by a master for data byte exchange and wherein an interrupt is generated when configured as a slave upon completion of a transfer of a data byte to its data register, the method comprising the steps of:

loading the data register of the first processor with a first data byte of a first message of the first processor to be transferred to the second processor, the first processor being initially configured as a slave;

initiating a message exchange by the second processor that is initially configured as a master by (A) loading its data register with a first data byte of a second message of the second processor to be transferred to the first processor, (B) exchanging the data bytes in the data registers by simultaneously clocking the data registers to transfer the first data byte of the second message from its data register into the data register of the first processor and simultaneously transfer the first data byte of the first message from the data register of the first processor into its data register, (C) reading the data byte transferred into its data register, (D) reconfiguring itself as a slave and (E) loading a second byte of the second message into its data register; and initiating subsequent exchanges of data bytes of the first and second multi-byte messages by each of the first and second processors responding to an interrupt generated upon the transfer of a data byte to its data register while configured as a slave by (A) reconfiguring itself as a master for controlling data byte exchanges, (B) reading the data byte in its data register, (C) loading the next data bye of its message to be transmitted to the other one of the first and second processors into its data register, (D) exchanging data bytes in the data registers of the first and second processors by simultaneously clocking the data registers to transfer the data byte from its data register into the data register of the other one of the first and second processors and simultaneously transfer the data byte from the data register of the other one of the first and second processors into its data register, (E) reading the data byte shifted into its data register (F) reconfiguring itself as a slave and (G) loading the next byte of its message to be transferred to the other one of the first and second processors into its data register, whereby the first and second processors are alternately configured as a master to control data byte exchanges.

3. The method of claim 2 wherein each data byte has $n+1$ bits, each data register has $n+1$ stages and wherein simultaneously clocking the data registers includes generating $n+1$ clock signals and providing the clock signals to clock inputs of each of the data registers.

* * * * *